United States Patent
Thomas et al.

(10) Patent No.: US 10,835,939 B2
(45) Date of Patent: Nov. 17, 2020

(54) SYSTEMS AND METHODS FOR THERMAL DESTRUCTION OF UNDESIRED SUBSTANCES BY SMOLDERING COMBUSTION

(71) Applicant: Chevron U.S.A. Inc., San Ramon, CA (US)

(72) Inventors: David G. Thomas, Perth (AU);
Kanwartej S. Sra, Houston, TX (US);
Paul J. H. Bireta, Houston, TX (US);
Gabriel P. Sabadell, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/608,797

(22) Filed: May 30, 2017

(65) Prior Publication Data

US 2018/0345338 A1 Dec. 6, 2018

(51) Int. Cl.
*B09C 1/00* (2006.01)
*B09C 1/08* (2006.01)
(Continued)

(52) U.S. Cl.
CPC ............... *B09C 1/06* (2013.01); *F23G 7/14* (2013.01); *F23G 2209/24* (2013.01)

(58) Field of Classification Search
CPC .. B09C 1/00; B09C 1/002; B09C 1/08; B09C 1/085; B09C 1/10; B09C 1/105;
(Continued)

(56) References Cited

U.S. PATENT DOCUMENTS 3,681,851 A * 8/1972 Fleming ............... C05F 9/02
34/291
4,402,274 A * 9/1983 Meenan ............... C02F 1/02
110/237

(Continued)

FOREIGN PATENT DOCUMENTS

WO      2014074295 A1    5/2014

OTHER PUBLICATIONS

Switzer, C., et al; "Self-Sustaining Smoldering Combustion: A Novel Remediation Process for Non-Aqueous-Phase Liquids in Porous Media"; Environmental Science & Technology, vol. 43, No. 15, (Aug. 15, 2009), pp. 5871-5877.
(Continued)

*Primary Examiner* — Edwin J Toledo-Duran

(57) ABSTRACT

Porous media containing undesired substances, e.g., perfluoroalkylated substances, are treated by mixing the porous media with a solid fuel comprising organic material. The mixture is heated to 200° C. to 400° C. to initiate smoldering combustion and an oxidizer gas is forced through the heated mixture such that the smoldering combustion is self-sustaining until the mixture reaches a PFAS destructive temperature and the perfluoroalkylated substances are thermally destroyed. A system is provided for conducting the treatment. The system includes a source of wax, wood chips, sawdust, tire scraps, waste rubber compounds, coal, granular activated carbon, solid fat, and combinations thereof as solid fuel. A mixer is provided for mixing the porous media with the solid fuel. An ignition system including static heating elements and a gas blower are provided for forcing heated oxidizer gas through the mixture such that self-sustaining smoldering combustion of the mixture is initiated and sustained.

25 Claims, 2 Drawing Sheets

(51) Int. Cl.
  *B09C 1/10* (2006.01)
  *B09C 1/06* (2006.01)
  *F23G 7/14* (2006.01)

(58) Field of Classification Search
  CPC ....... B09C 2101/00; B09C 1/06; B09C 1/062; B09C 1/065; B09C 1/067
  USPC .... 405/128.5, 128.55, 128.6, 128.65, 128.45
  See application file for complete search history.

(56) References Cited

U.S. PATENT DOCUMENTS

| | | | | |
|---|---|---|---|---|
| 4,615,712 A * | 10/1986 | Wen | ............. | C10L 5/10 44/551 |
| 4,782,625 A * | 11/1988 | Gerken | ............. | A01B 77/00 405/128.85 |
| 4,844,807 A * | 7/1989 | Manchak, Jr. | ............. | B09B 1/00 210/682 |
| 4,913,586 A * | 4/1990 | Gabbita | ............. | B09C 1/00 210/728 |
| 4,927,293 A * | 5/1990 | Campbell | ............. | B09C 1/00 404/92 |
| 4,934,931 A * | 6/1990 | Angelo, II | ............. | F23G 5/027 110/246 |
| 5,169,263 A * | 12/1992 | Johnson | ............. | B09C 1/06 405/128.4 |
| 5,193,934 A * | 3/1993 | Johnson | ............. | B09C 1/065 405/128.35 |
| 5,236,282 A * | 8/1993 | Teasel | ............. | B09C 1/08 405/128.7 |
| 5,259,962 A * | 11/1993 | Later | ............. | B09C 1/08 110/226 |
| 5,458,747 A * | 10/1995 | Marks | ............. | B01D 61/42 204/515 |
| 5,671,762 A * | 9/1997 | Hancock, Jr. | ............. | B03B 5/00 134/104.3 |
| 5,678,494 A * | 10/1997 | Ulrich | ............. | F23G 5/027 110/102 |
| 5,813,799 A * | 9/1998 | Calcote | ............. | B09C 1/002 166/272.1 |
| 5,967,230 A * | 10/1999 | Cooper | ............. | B09C 1/002 166/245 |
| 6,171,030 B1 * | 1/2001 | Miyake | ............. | E02D 3/005 37/142.5 |
| 6,391,627 B1 * | 5/2002 | Parry | ............. | C05F 9/00 435/290.1 |
| 7,674,946 B2 * | 3/2010 | Cerea | ............. | B09C 1/06 588/312 |
| 8,132,987 B2 * | 3/2012 | Gerhard | ............. | F23G 7/14 405/128.85 |
| 9,168,409 B2 | 10/2015 | Thomas et al. | | |
| 9,259,770 B2 | 2/2016 | Thomas et al. | | |
| 2002/0129808 A1 * | 9/2002 | Manner | ............. | C10L 5/40 126/45 |
| 2005/0109710 A1 * | 5/2005 | Mitarai | ............. | B09C 1/005 210/750 |
| 2008/0135413 A1 | 6/2008 | Thomas et al. | | |
| 2009/0180836 A1 * | 7/2009 | Gerhard | ............. | B09C 1/06 405/128.85 |
| 2011/0061577 A1 * | 3/2011 | Lo | ............. | F23G 7/003 110/235 |
| 2012/0073932 A1 * | 3/2012 | Burnett | ............. | B09B 3/00 196/104 |
| 2012/0272878 A1 * | 11/2012 | Grant | ............. | F23G 7/14 110/346 |
| 2012/0288332 A1 * | 11/2012 | Thomas | ............. | B09B 3/0083 405/128.6 |
| 2013/0310624 A1 * | 11/2013 | Thomas | ............. | A62D 3/40 588/321 |
| 2014/0241806 A1 | 8/2014 | Rockwell et al. | | |

OTHER PUBLICATIONS

International Search Report, dated Sep. 3, 2018, during the prosecution of International Application No. PCT/IB2018/053727.
Written Opinion of the International Searching Authority, dated Sep. 3, 2016, during the prosecution of International Application No. PCT/IB2018/053727.
Baud, G., S. Salvador, G. Debenest, and J. Thovert. New Granular Model Medium to Investigate Smoldering Fronts Propagation—Experiments, Energy and Fuels, 2015, 29, 6780−6792, DOI: 10.1021/acs.energyfuels.5b01325†

* cited by examiner
† cited by third party

SYSTEMS AND METHODS FOR THERMAL DESTRUCTION OF UNDESIRED SUBSTANCES BY SMOLDERING COMBUSTION

FIELD

The present disclosure relates to the field of reduction of undesired substances mixed into a porous media, particularly using smoldering combustion for the thermal destruction of the substances.

BACKGROUND

A commonly encountered problem is the need to remove undesired industrial chemicals from soils or other materials such as drilling cuttings. Soils may contain hydrocarbons such as oil and fuels. In some instances, soils may contain perfluorinated and polyfluorinated compounds (collectively referred to herein as "PFAS compounds" or simply "PFAS"). PFAS is a family of about 6,000 fluorinated compounds, with perflourooctane sulfonic acid (PFOS) and perfluorooctanoic acid (PFOA) representing just two such compounds. These compounds are used in various applications e.g., high performance surfactants in firefighting foams and in hydrocarbon vapor suppressants. Environmental regulations on PFAS are evolving with drinking water standards at parts per trillion (ppt) levels. The U.S. Environmental Protection Agency (USEPA) has produced guidance including reference levels for PFAS in groundwater, soil and sediment. For instance, in 2016 the USEPA established a guidance level of no more than 70 ppt of PFOA and PFOS in drinking water. Some PFAS compounds are restricted in most parts of the world under the Stockholm Convention.

Fluorination of carbon compounds, as in the case of PFAS, shields the molecule from biotic and abiotic transformations. This implies that many traditional removal technologies that apply to hydrocarbons may not work for PFAS. Currently, the use of sorbents such as granular or powdered activated carbon appear to be the most common and effective treatment technology in aqueous media. The sorbent removes and concentrates PFAS from the aqueous media, such that it can be subsequently disposed. The treatment technology is limited to aqueous media and does not apply to soil or sediments that may be impacted with PFAS. Additionally, it does not destroy PFAS but generates additional waste streams that must be treated. According to the USEPA, the incineration of concentrated PFAS wastes is needed for complete destruction of PFAS. Methods such as incineration and thermal destruction using plasma for destruction of additional waste streams from PFAS treatment process are very energy intensive and expensive. Facilities that will accept PFAS wastes are limited and associated costs are high. No mechanism exists to utilize energy generated from the treatment of other wastes, e.g., hydrocarbon-impacted soils, coal tar or other fuels, to ease the energy and cost burden. Other treatment technologies, such as advanced oxidation processes that can be used for typical hydrocarbons, are not effective in destroying a wide range of PFAS in aqueous phase or in the recovered waste streams.

There exists a need for a method and system for reducing or destroying substances having high destruction temperatures, such as PFAS, including PFOS, PFOA and their salts and precursors, in solid porous media in a less costly and simpler manner.

SUMMARY

In one aspect, a method is provided for treating porous media containing undesired substances. The method includes mixing the porous media containing the undesired substances with a solid fuel comprising organic material to form a mixture. A portion of the mixture is heated to 200° C. to 400° C. to form a heated mixture and to initiate smoldering combustion of the heated mixture. An oxidizer gas is forced through a portion of the heated mixture such that the smoldering combustion of the heated mixture is self-sustaining. The self-sustaining smoldering combustion of the mixture continues until the mixture reaches an undesired substance destructive temperature.

In another aspect, a system is provided for treating porous media containing undesired substances. The system includes a source of solid fuel selected from the group consisting of wax, wood chips, sawdust, tire scraps, waste rubber compounds, coal, granular activated carbon, solid fat, and combinations thereof. A mixer is provided for receiving the porous media containing the undesired substances and the solid fuel and mixing the porous media containing the undesired substances with the solid fuel to form a mixture. An ignition system located below the mixture is provided to heat a portion of the mixture. A gas blower is provided for forcing an oxidizer gas through a portion of the heated mixture such that self-sustaining smoldering combustion of the mixture is initiated.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
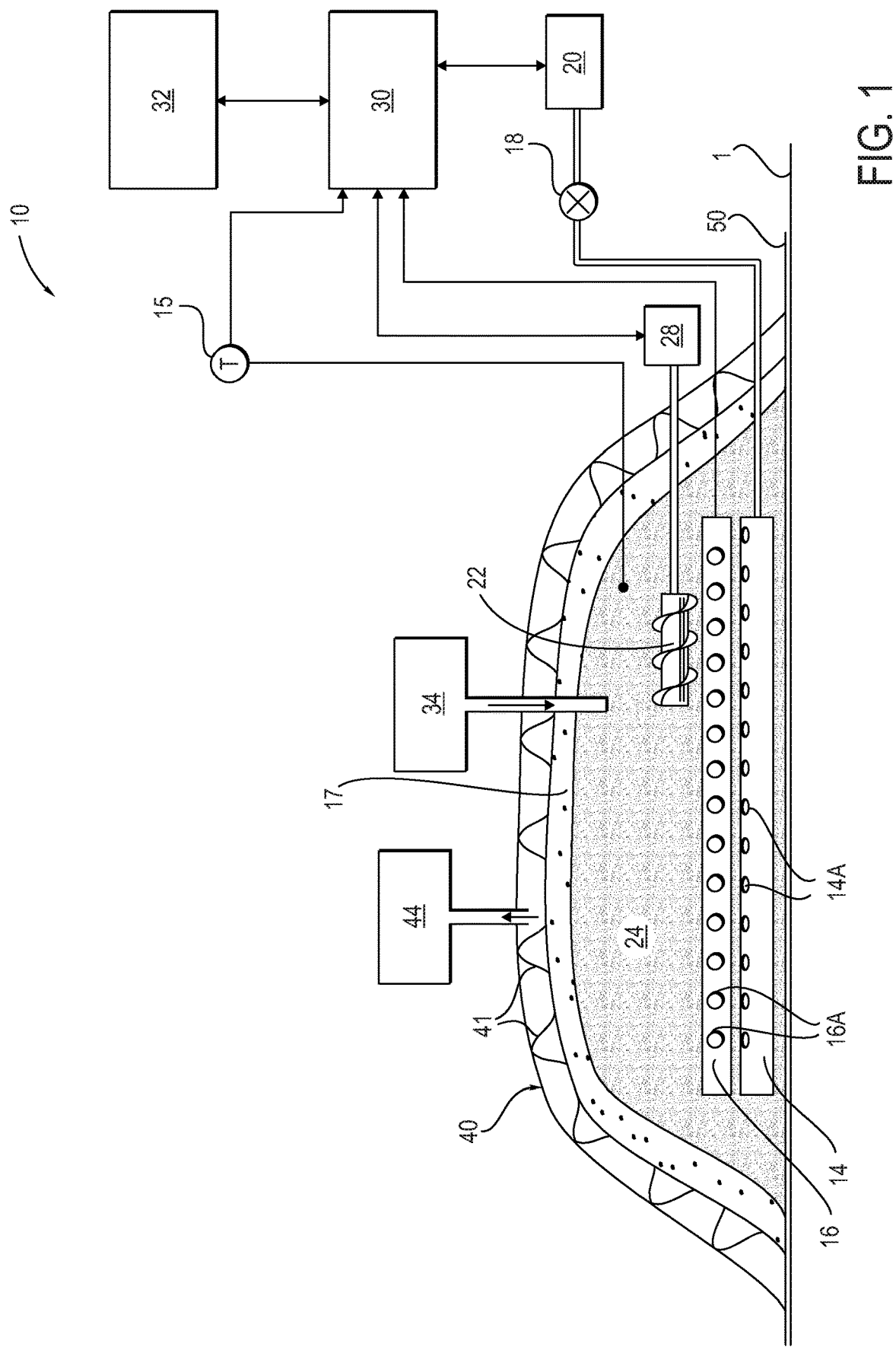
FIG. 1 is a schematic diagram illustrating a system in which a smoldering combustion process may be operated according to an exemplary embodiment.

It has been recognized that smoldering combustion processes may be a useful technique in the treatment of soils. However, in the case of soils containing undesired substances requiring higher treatment temperatures, known smoldering combustion processes are ineffective. Such substances include PFAS and asbestos. Described herein is a method for thermal treatment of soils containing such substances in which an engineered fuel mixture is combined with the soil to provide a combustible mixture. The ratio of the soil to the engineered fuel mixture is determined such that a smoldering combustion process is initiated and reaches a sufficiently high temperature to destroy the substance present in the mixture.

In one embodiment, an engineered fuel mixture is added and mixed with porous media, e.g. soil, also simply referred to herein as "soil," containing PFAS. The porous media can be formed by contacting a sorbent media with water containing PFAS.

The engineered fuel mixture is used to ensure a self-sustaining smoldering combustion process in the soil-fuel mixture. The self-sustaining smoldering combustion process using the engineered fuel mixture can generate a sufficiently high temperature to destroy the undesired substances in the soil-fuel mixture, also referred to as an "undesired substance destructive temperature," or in the case of PFAS, a "PFAS destructive temperature." PFAS destructive temperatures can be at least about 800° C., e.g., between 800° C. and 1200° C., even between 800° C. and 1000° C. Advantageously, this differs from conventional smoldering combustion processes that use a liquid organic fuel. Specifically, those processes are typically operated at lower temperatures that do not destroy PFAS. Advantageously, it has been found that by selecting low volatility organic solids as the fuel, the self-sustaining smoldering combustion process can generate a PFAS destructive temperature.

In one embodiment, the engineered fuel mixture can include low cost and readily available organic solid materials, including but not limited to wax, wood chips, sawdust, tire scraps, waste rubber compounds, coal, granular activated carbon, solid fat, and combinations thereof. In one embodiment, the engineered fuel mixture can include particles of the organic solid material(s) having a median particle size diameter of less than 20 times a median particle size diameter of the soil particles. In one embodiment, the engineered fuel mixture is free of oil and/or fat. In one embodiment, the solid fuel is free of combustible liquid. The engineered fuel mixture contains organic solid materials to achieve a higher smoldering temperature than organic liquid fuels could achieve. In one embodiment, as a result of the smoldering combustion process using the engineered fuel mixture, PFAS compounds are not detectable in the remaining mixture after combustion in concentrations exceeding 70 ppt. In one embodiment, as a result of the smoldering combustion process using the engineered fuel mixture, no PFAS compounds are detectable in the remaining mixture after combustion. PFAS can be reliably and uniformly destroyed in the soil-fuel mixture.

FIG. 1 shows a schematic representation of a system 10 in which the smoldering combustion process may be operated. The smoldering combustion process takes place in a volume of the combustible mixture 24, also referred to as a reaction volume, above ground or at the ground surface 1.

In one embodiment, the system 10 includes a distribution structure 14 for distributing an oxidizer gas such as air into the volume of the combustible mixture 24. The structure 14 provides a suitable flow of gaseous oxidizer into the combustible mixture 24. A feed pipe links the air distribution structure to a valve 18 and a controller to control the flow of the oxidizer into the combustible mixture. Although the depicted arrangement illustrates the distribution of air, more generally the structure 14 may be used to distribute a gas that acts to sustain the smoldering combustion process once initiated in the volume of the combustible mixture 24. Examples of such gases include oxygen, oxygen-enriched air or other gases that are appropriate for sustaining a smoldering combustion process. Thus, air used to propagate the smoldering combustion process may be supplemented with a fuel or another gas, for example natural gas, propane, butane, nitrogen or carbon dioxide, to control or modify the properties of the combustion process. The air distribution structure 14 may be a network of piping that is perforated or slotted to enable the passage of gas into the volume of the combustible mixture 24. For example, perforations 14A are shown. The network of piping may, for example, be a metal or ceramic structure. The feed pipe to the air distribution structure 14 includes an actuator or valve 18 that is used to control the pressure or flow rate of gas into the distribution system 14. The system includes an air supply also referred to as a gas blower 20, which may include a compression system to supply compressed air to the distribution structure 14.

In one embodiment, the system 10 also includes an ignition system 16, which serves to raise the temperature of at least a portion of the combustible mixture 24 near the ignition system to a temperature that is sufficiently high to initiate the smoldering combustion. The ignition system 16 can be located below the combustible mixture 24.

In one embodiment, the ignition system 16 uses static heating elements 16A. There are several ways in which the static heating elements 16A of the ignition system 16 may be implemented. For example, the ignition system may use electrical resistance heating elements 16A as the static heating elements. In one embodiment, the ignition system 16 can be located within the air distribution structure 14 such that the electrical resistance heating elements 16A are positioned among the gas outlets 14A. In one embodiment, the ignition system 16 can be located above the air distribution structure 14 such that the electrical resistance heating elements 16A are positioned above the gas outlets 14A. In one embodiment, the electrical resistance heating elements 16A are embedded within the mixture 24, also above the gas outlets 14A. Alternatively, the ignition system may include a gas burner (not shown) that burns an ignition gas to raise the temperature of the surrounding mixture. In this case, the ignition system would include a feed pipe to the exterior of the volume of the combustible mixture 24 to supply the ignition fuel to the ignition system. An actuator and gas supply would then be provided to control the flow of the ignition fuel to the ignition system 16. In another scenario, hot gas may be introduced directly into the distribution structure 14 from outside of the volume of the combustible mixture 24.

The combustible mixture 24 is heated by flowing the oxidizer gas in contact with the static heating elements 16A and into the mixture 24 such that heat is transferred into the mixture 24 by conduction and/or convection from the oxidizer gas. A temperature sensor 15 can be used to monitor the temperature of the mixture 24 during the self-sustaining smoldering combustion of the mixture.

The gas blower 20 forces the oxidizer gas through the portion of the heated mixture 24. The gas blower 20 is positioned such that the gas blower forces oxidizer gas into the space between static heating elements 16A in the ignition system through the distribution structure 14. The distribution structure 14 is attached to the gas blower 20 and feeds gas to the base or sides of the volume of the combustible mixture 24 so that air enters the base of the volume of the combustible mixture 24 under pressure and gas flow is induced upward and into the mixture 24. The gas blower 20 can cause the oxidizer gas to flow through the mixture at an average velocity of from 0.5 cm/sec to 7 cm/sec. If an additional gas is added to the air supply, there may be further storage vessels (not shown) to store the additional gas and controllable valves operable to mix the additional gas with the air supply.

Figure 2:
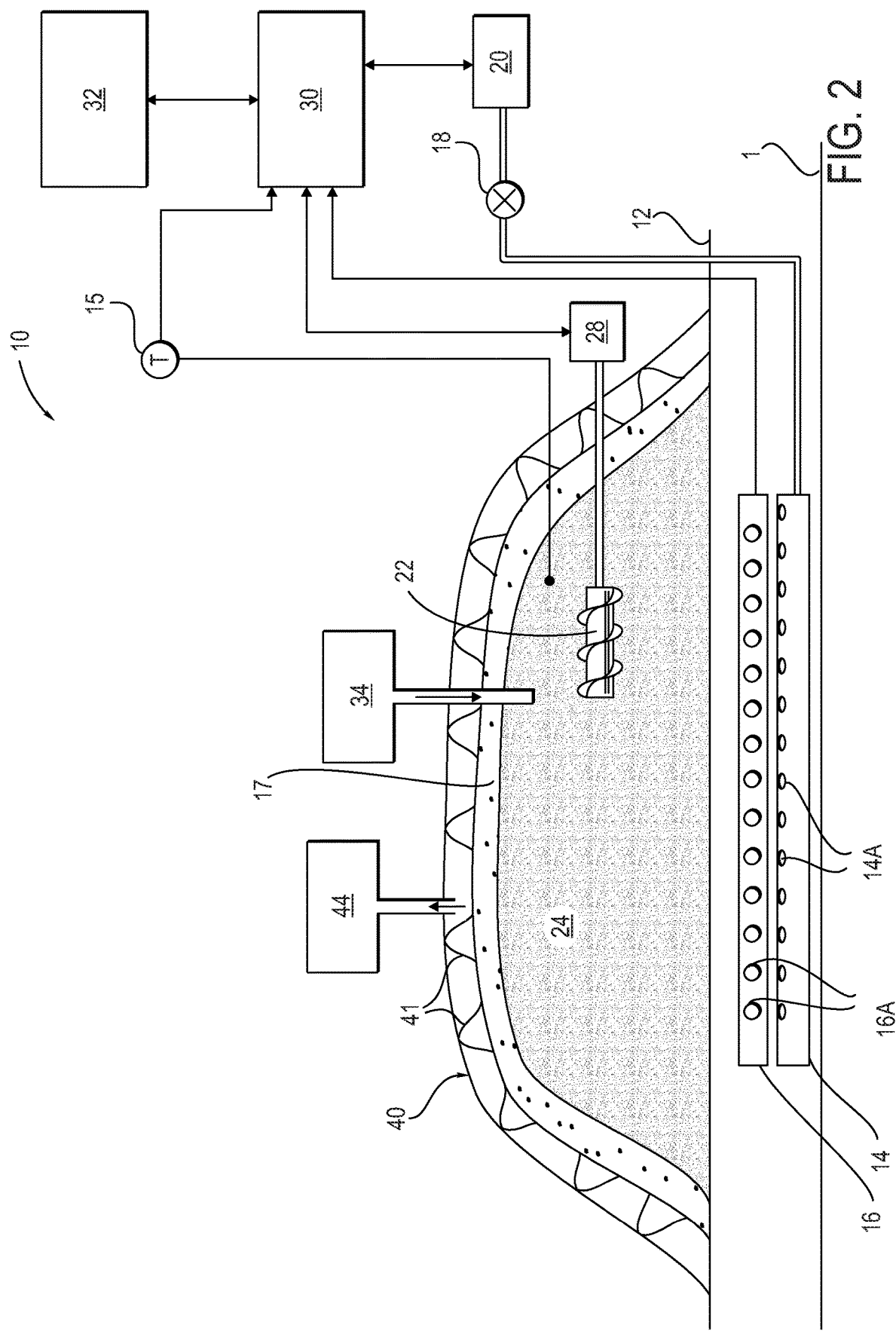
FIG. 2 is a schematic diagram illustrating a system in which a smoldering combustion process may be operated according to another exemplary embodiment.

In one embodiment, shown in FIG. 2, the system 10 includes a support 12 on which the mixture 24 is supported. The support 12 can be a grid or any other permeable platform or frame through which the oxidizer gas can pass.

As shown, the distribution structure 14 and the ignition system 16 are located below the support 12. The distribution structure 14 and the ignition system 16 operate as described with respect to FIG. 1.

While it is shown that the distribution structure 14 and the ignition system 16 are located below the mixture 24, it is alternatively contemplated that the ignition system 16 could be located between the reaction volume and the gas blower 20, still connected to the distribution structure 14.

In use, the volume of the combustible mixture 24 contains the porous PFAS containing material. The volume of the combustible mixture 24 may also include additional porous media to act as a matrix for the smoldering combustion process. The porous matrix may, for example, be soil. In other applications, an inert material such as ceramic balls or silica sand may be added to the volume of the combustible mixture 24 to provide a framework for the combustion. The porosity of the material in the volume of the combustible mixture 24 should be sufficient to permit a flux of an oxidizer such as air to sustain the smoldering combustion. The porous matrix in the volume of the combustible mixture 24 may include particulates, grains, fibers or mixtures thereof. Porosity is a parameter that describes the ratio of void space to the total bulk of the material. The porosity of the material in the volume of the combustible mixture 24 may range, for example, between around 0.1 for a low porosity material to around 0.7 for a porous clay or peat.

One way of measuring the proportion of engineered fuel mixture in the combustible mixture 24 is to consider the volume fraction of the pore space that is occupied by the engineered fuel mixture. Preferably the volume fraction in the combustible mixture is greater than 1% to enable a self-sustaining combustion front to propagate through the volume of the combustible mixture 24. A target range of the volume fraction in the combustible mixture 24 is 1% to 5%. Higher volume fractions, for example in the range 5% to 25% or more may also be used, although there may be trade-offs to consider in establishing a target range. For example, the overall cost of the treatment process may increase if greater quantities of engineered fuel mixture are added. Also, adding large amounts of engineered fuel mixture may reduce the available space for the volume of porous material. The engineered fuel mixture can be added to the mixture 24 using a feeder 34 for introducing the engineered fuel mixture.

The system 10 may include an actuator 22, also referred to as a mixer, to mix the porous media and the engineered fuel mixture to reduce the heterogeneity of the resulting combustible mixture 24. An example of an actuator 22 is a soil auger having a helical structure to turn and blend the combustible mixture 24. The actuator 22 may have an associated drive 28. In some arrangements, the actuator 22 may be a mobile system that is inserted into the volume of the combustible mixture 24 to blend the material during the mixing of the fuel material and the porous media. In other arrangements, the porous media may be combined with the engineered fuel mixture before the resulting combination is added to the volume of the combustible mixture 24. For example, the combination may occur in a storage vessel (not shown) and fed to the mixture using feeder 34. The combustible mixture may then be transported to the volume of the combustible mixture 24, for example via a pipe or conveyor system or in a vehicle. In some instances, earth-moving equipment may be used to combine or blend the combustible mixture 24. The purpose of the combining or mixing is to reduce the heterogeneity of the combustible mixture. In general, it is not necessary to eliminate variation of the material. However, it is desirable to avoid having regions within the reaction volume that do not have a sufficient concentration of combustible material to sustain the smoldering combustion process.

In one embodiment, the oxygen content of the oxidizer gas can be modified (by increasing or decreasing) to control the temperature, sustainability or efficiency of the smoldering process. Methods of increasing the oxygen content may include adding oxygen to the air stream (as the oxidizer gas), or adding a solid or heat-activated oxidant to the combustible mixture. In one embodiment, a solid or liquid oxygen source can be added to the combustible mixture 24. The solid or liquid oxygen source will release oxygen gas during the heating of the mixture during the smoldering combustion process. In one embodiment, an optional layer of soil 17, e.g., clean soil, can be provided over the mixture 24 during the self-sustaining smoldering combustion of the mixture 24.

As would be apparent to one of ordinary skill in the art, the system 10 may include a control system 30 to supervise the operation of the thermal treatment, typically including at least one computational device, which may be a microprocessor, a microcontroller, a programmable logical device or another suitable device. Instructions and data to control operation of the computational device may be stored in a memory which is in data communication with, or forms part of, the computational device. The instructions and data for controlling operation of the system 10 may be stored on a computer readable medium from which they are loaded into the memory. Instructions and data may be conveyed to the control system 30 by means of a data signal in a transmission channel. Examples of such transmission channels include network connections, the internet or an intranet and wireless communication channels. The control system 30 is typically in data communication with a user interface 32 that allows users to enter information into the control system and includes displays to enable users to monitor the operation of the system 10. The control system is in data communication with the air distribution system 14, valve 18, air supply 20 and the drive 28 of the actuator 22. Temperature sensors 15 may also be positioned in or around the volume of the combustible mixture 24 to monitor the state of the combustion process. Where such instrumentation is provided, the data generated by the instrumentation may be displayed locally near the instruments. The data may be provided to the control system 30 for display on the user interface 32 and storage in memory.

In one embodiment, the material that has been treated by combustion in the smoldering combustion process is removed from the volume of the combustion mixture after a period of time sufficient to destroy the PFAS. The smoldering combustion process moves through the mixture 24 naturally as it consumes the engineered fuel mixture. The temperature of the smoldering mixture, and thus the time necessary for the smoldering combustion process to move through the mixture 24, is a function of the particular fuel and the air flow rate used. Too much air flow will reduce the temperature.

The amount of material removed can be monitored, e.g., using a scale (not shown) to monitor the weight of the material removed. The mixture can then be replenished on the ignition system 16 to continue the smoldering combustion. The rate of replenishing the mixture 24 depending on the monitored amount of removed material can thereby be controlled. This can be controlled as a batch or semi-continuous process.

In one embodiment, an optional tarp 40 covers the reaction volume and serves to trap off-gases produced in the combustion of the combustible mixture 24. One or more flues or hoses 42 can be provided in the tarp 40 to remove or collect the off-gases to a gas treatment process 44 where the off-gases vaporized in the mixture can be treated. Optional spacer supports 41 can be used to hold the tarp 40 off the material in the reaction volume to create space between the material 24 and the tarp 40.

In one embodiment, the reaction volume is lined with an optional thermal barrier 50 which may serve to limit or prevent the flow of liquids or gases from the reaction volume to adjacent regions. The barrier 50 may also serve to insulate the reaction volume to limit heat losses from the combustion process. Such thermal insulation may serve to improve the efficiency of the combustion.

The porous media or soil need not be uniform in its structural composition and may include particular material, grains or fibers. The combustible mixture 24 contains PFAS containing soil and the engineered fuel mixture. The amount of interstitial space between the soil and the engineered fuel mixture elements of the combustible mixture 24 influences the nature of the combustion process. The porosity of the combustible mixture 24 also influences the oxidizer flux and hence on the flow rate and pressure required of the air supply 20. The control system 30 having a computer processor and computer readable media may be programmed to control or vary the air supply to the air distribution structure 14. For example, in some applications increasing the flow rate of oxidizer may increase the combustion temperature. The flow rate of oxidizer into the combustible mixture 24 may be expressed as a Darcy flux. A suitable range of oxidizer flux to sustain smoldering combustion in the reaction volume may be 0.5 to 10.0 cm/s.

The ignition system 16 can be started to heat to a specified ignition temperature. The heat and the air supply through the air distribution structure 14 may be switched on together. The combustible mixture 24 ignites at a combustion temperature, which may for example be in the range of 200° C. to 400° C., and creates a smoldering combustion front that moves through the combustible mixture 24. The source of external heating via the ignition system 16 may be switched off while the air supply continues to sustain the smoldering combustion. In some applications, the combustion may provide a near complete conversion of organic wastes including the PFAS to $CO_2$. The combustion process ends if the combustible material in the reaction volume including all the PFAS is destroyed, such that no perfluoroalkylated substances are detectable in the mixture, or if the supply of oxidizer gas is interrupted.

Smoldering combustion processes are discussed, for example, in Pironi et al "Small-scale forward smoldering experiments for treatment of coal tar in inert media," *Proceedings of the Combustion Institute,* 32, pp. 1957-1964, 2009. Smoldering combustion is described as the flameless burning of a condensed fuel that derives heat from surface oxidation reactions. The smoldering combustion is a relatively slow combustion sustained by the heat resulting from the combustion of an oxidizer on the surface of a condensed-phase fuel. The methods described herein provide a potentially low-cost and effective treatment of PFAS material that would otherwise be very costly or impractical to treat at all. In many cases, the product of the combustion process may be suitable for reuse, as opposed to previously-existing options that typically involve containment of the porous media requiring long-term management or off-site disposal.

The operation of the system 10 may be supplemented by the management of a plurality of stockpiles of waste material having different concentrations of PFAS. An inventory of available waste materials may be maintained to determine suitable sources of engineered fuel mixture and PFAS containing material for mixing in the reaction volume to achieve conditions required to treat the PFAS containing material. Management of the stockpiles may also be operated from the control system. Where the combustible mixture 24 is prepared external of the reaction volume, the external combination may also be supervised from the control system.

It should be noted that only the components relevant to the disclosure are shown in the figures, and that many other components normally part of a smoldering combustion treatment system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A method for treating porous media containing an undesired substance, comprising:
  a. adding a solid fuel comprising organic material to the porous media containing the undesired substance to form a mixture that is capable of reaching an undesired substance destructive temperature of at least 800° C., wherein the mixture comprises from 1 to 5% of the solid fuel by vol;
  b. heating a portion of the mixture to 200° C. to 400° C. to form a heated mixture and to initiate smoldering combustion of the heated mixture;
  c. initiating a flow of an oxidizer gas through a portion of the heated mixture and controlling the flow at a rate such that the smoldering combustion of the heated mixture is self-sustaining; and d. continuing the self-sustaining smoldering combustion of the mixture until the mixture reaches the undesired substance destructive temperature of at least 800° C., wherein the porous media comprises soil and the undesired substance comprises a perflouroalkylated substance.

2. The method of claim 1, wherein the solid fuel is selected from the group consisting of wax, wood chips, sawdust, tire scraps, waste rubber compounds, coal, granular activated carbon, solid fat, and combinations thereof.

3. The method of claim 1, wherein the solid fuel is free of oil and/or fat.

4. The method of claim 1, wherein the solid fuel is free of combustible liquid.

5. The method of claim 1, where the solid fuel comprises particles having a median particle size diameter of less than 20 times a median particle size diameter of the porous media.

6. The method of claim 1, wherein the heating the portion of the mixture is accomplished by flowing the oxidizer gas in contact with static heating elements and into the mixture such that heat is transferred into the mixture by conduction and/or convection from the oxidizer gas.

7. The method of claim 1, wherein the heating is terminated once the self-sustaining smoldering combustion of the mixture is initiated.

8. The method of claim 1, wherein the forcing the oxidizer gas through the portion of the heated mixture is accomplished by a gas blower and the oxidizer gas flows through the mixture at an average velocity of from 0.5 cm/sec to 7 cm/sec.

9. The method of claim 1, wherein perfluoroalkylated substance is detectable in the mixture after step (d) at no greater than 70 parts per trillion.

10. The method of claim 1, wherein no perfluoroalkylated substances are detectable in the mixture after step (d).

11. The method of claim 1, wherein the mixture is heated in step (b) by an ignition system activatable to initiate the smoldering combustion located below the mixture.

12. The method of claim 1, further comprising:
a. removing material that has been treated by combustion in the smoldering combustion process;
b. monitoring a removed amount of the treated material;
c. replenishing the mixture on the ignition system to continue the smoldering combustion; and
d. controlling a rate of replenishing the mixture dependent on the monitored amount of removed treated material.

13. The method of claim 1, further comprising:
a. collecting off-gases from the mixture during the smoldering combustion; and
b. processing the off-gases to treat off-gases vaporized in the mixture.

14. The method of claim 1, wherein the porous media containing the perfluoroalkylated substance is formed by contacting sorbent media with water containing the perfluoroalkylated substance.

15. The method of claim 1, wherein the mixture formed in step (a) further comprises a solid or liquid oxygen source that releases oxygen gas during the heating in step (b).

16. A system for treating porous media containing an undesired substance, comprising:
a. a source of solid fuel selected from the group consisting of wax, wood chips, sawdust, tire scraps, waste rubber compounds, coal, granular activated carbon, solid fat, and combinations thereof;
b. a mixer for receiving the porous media containing the undesired substance and the solid fuel and mixing the porous media containing the undesired substance with the solid fuel to form a mixture, wherein the mixture comprises from 1 to 5% of the solid fuel by vol;
c. an ignition system located below the mixture to heat a portion of the mixture; and
d. a gas blower for initiating a flow of an oxidizer gas through a portion of the heated mixture such that self-sustaining smoldering combustion of the mixture is initiated,
wherein the porous media containing an undesired substance comprises soil comprising PFAS.

17. The system of claim 16, further comprising a scale for monitoring an amount of the mixture removed from the system following the treatment of the porous media containing the undesired substance.

18. The system of claim 16, further comprising a temperature sensor to monitor the temperature of the mixture during the self-sustaining smoldering combustion of the mixture.

19. The system of claim 16, wherein the mixer further receives a solid or liquid oxygen source to be included in the mixture that releases oxygen gas during the heating of the portion of the mixture.

20. The system of claim 16, further comprising a flexible tarp for covering the mixture during the self-sustaining smoldering combustion of the mixture.

21. The system of claim 16, further comprising a layer of soil over the mixture during the self-sustaining smoldering combustion of the mixture.

22. The system of claim 16, further comprising a hose to recover vapor from the mixture during the self-sustaining smoldering combustion of the mixture.

23. The system of claim 16, wherein the ignition system comprises static heating elements having space therebetween and the gas blower is positioned such that the gas blower forces oxidizer gas into the space through a gas blower outlet.

24. The system of claim 23, wherein the static heating elements are electrical resistance heating elements for embedding within the mixture.

25. The system of claim 16, further comprising a permeable support on which the mixture is supported through which the oxidizer gas can pass into the mixture wherein the ignition system is located below the support.

* * * * *